United States Patent [19]

Hostetler

[11] 3,918,405

[45] Nov. 11, 1975

[54] WEIGHT-CONTROLLED RECIRCULATING FEEDING APPARATUS AND METHOD

[75] Inventor: Eldon Hostetler, Middlebury, Ind.

[73] Assignee: Chore-Time Equipment, Inc., Milford, Ind.

[22] Filed: Jan. 14, 1974

[21] Appl. No.: 433,222

[52] U.S. Cl. .......................................... 119/52 AF
[51] Int. Cl.² ......................................... A01K 5/02
[58] Field of Search ............ 119/52 AF; 222/55, 56

[56] References Cited
UNITED STATES PATENTS

| | | | |
|---|---|---|---|
| 2,366,075 | 12/1944 | Weyandt | 222/55 |
| 2,381,505 | 8/1945 | Lindholm | 222/56 |
| 2,597,064 | 5/1952 | Charles et al. | 119/52 AF |

*Primary Examiner*—Hugh R. Chamblee
*Attorney, Agent, or Firm*—Olson, Trexler, Wolters, Bushnell & Fosse

[57] ABSTRACT

A weight controlled recirculating feeder is provided. Feed is delivered from a remote supply to a hopper suspended from a weight scale until a pre-designated weight has been accumulated. When the weight scale trips, a shut-off valve closes, and feed is directed to downstream weight-sensitive hoppers. At a pre-designated time, feed is transferred from the hoppers to recirculating feeders by a transfer conveyor, and undelivered feed is returned to the hopper. The recirculating conveyors each include a first line feeder including an open topped trough and means for moving feed along the trough from an upstream receiving point past a series of poultry cages to a downstream point. A first cross conveyor, a return line feeder, and a second cross conveyor operate to return unconsumed feed to the upstream feed receiving point. At the receiving point, a receiver accepts the returned feed and fresh feed from the hopper, mixes the feed stream, and discharges the feed to the recirculating conveyor to recurrently present feed particles to the devouring poultry until they are consumed.

23 Claims, 14 Drawing Figures

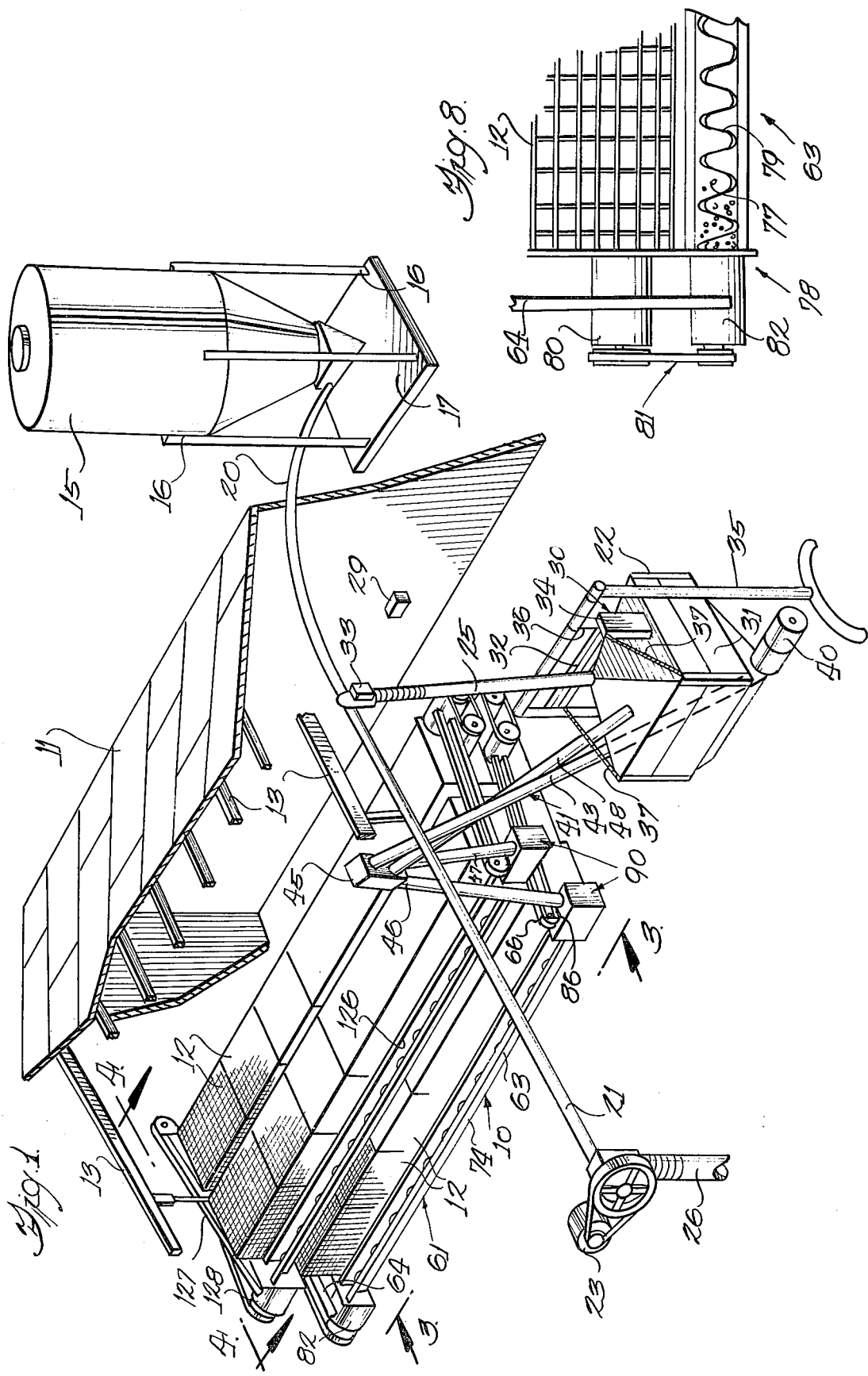

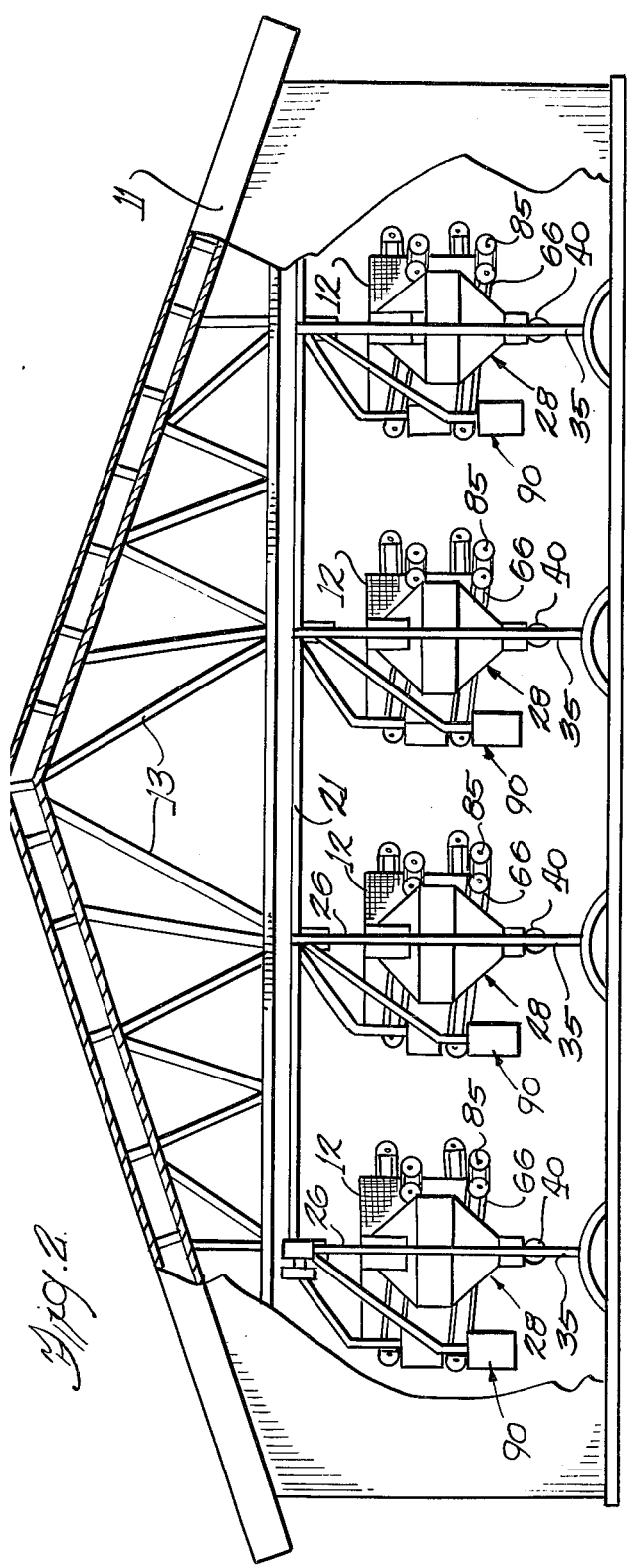
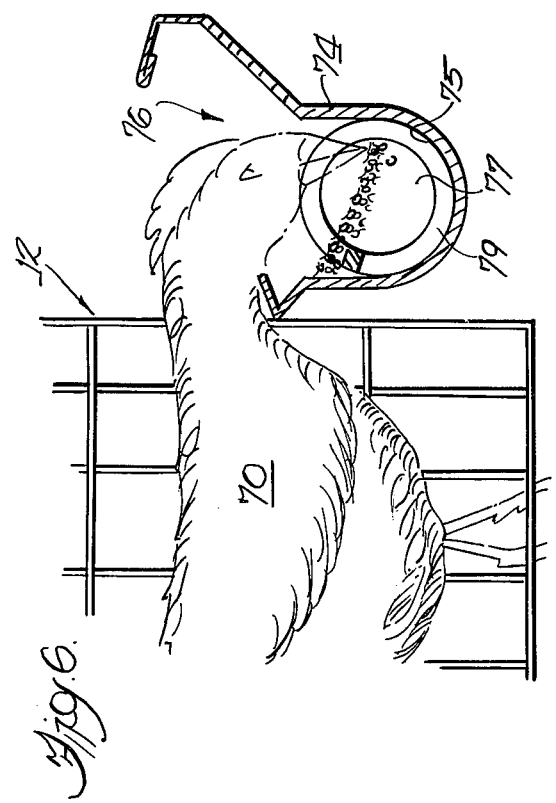
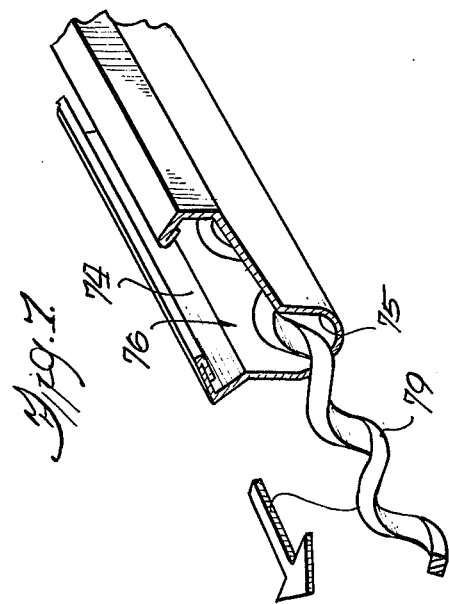

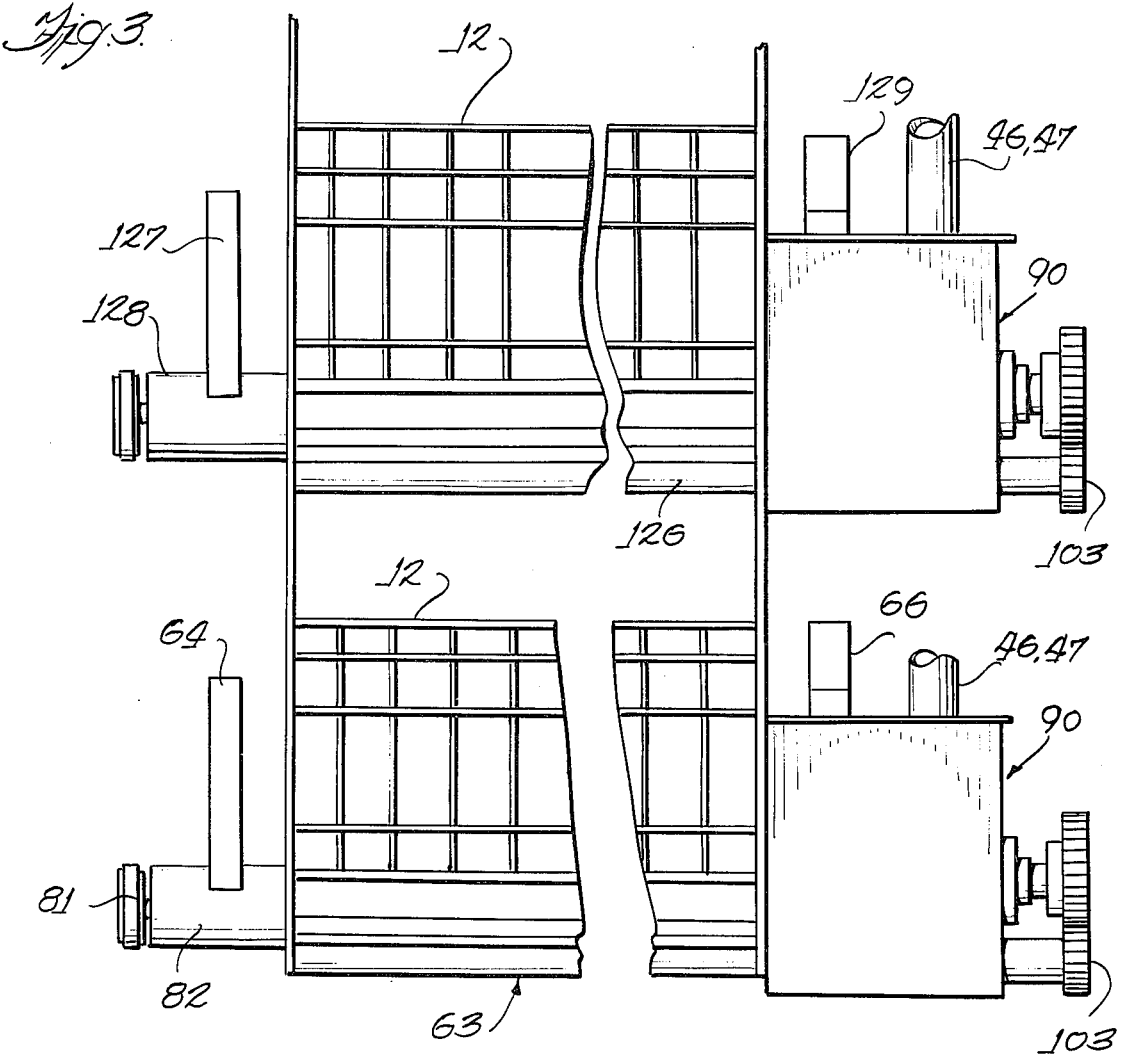
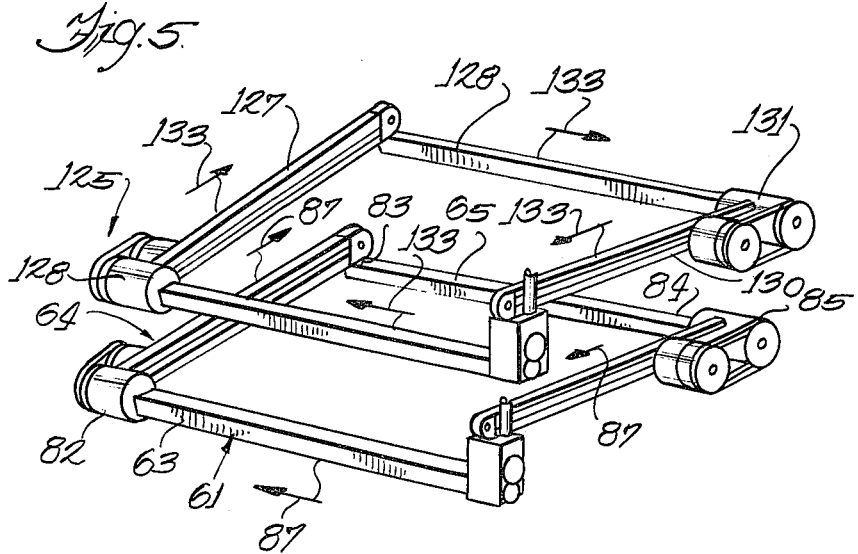

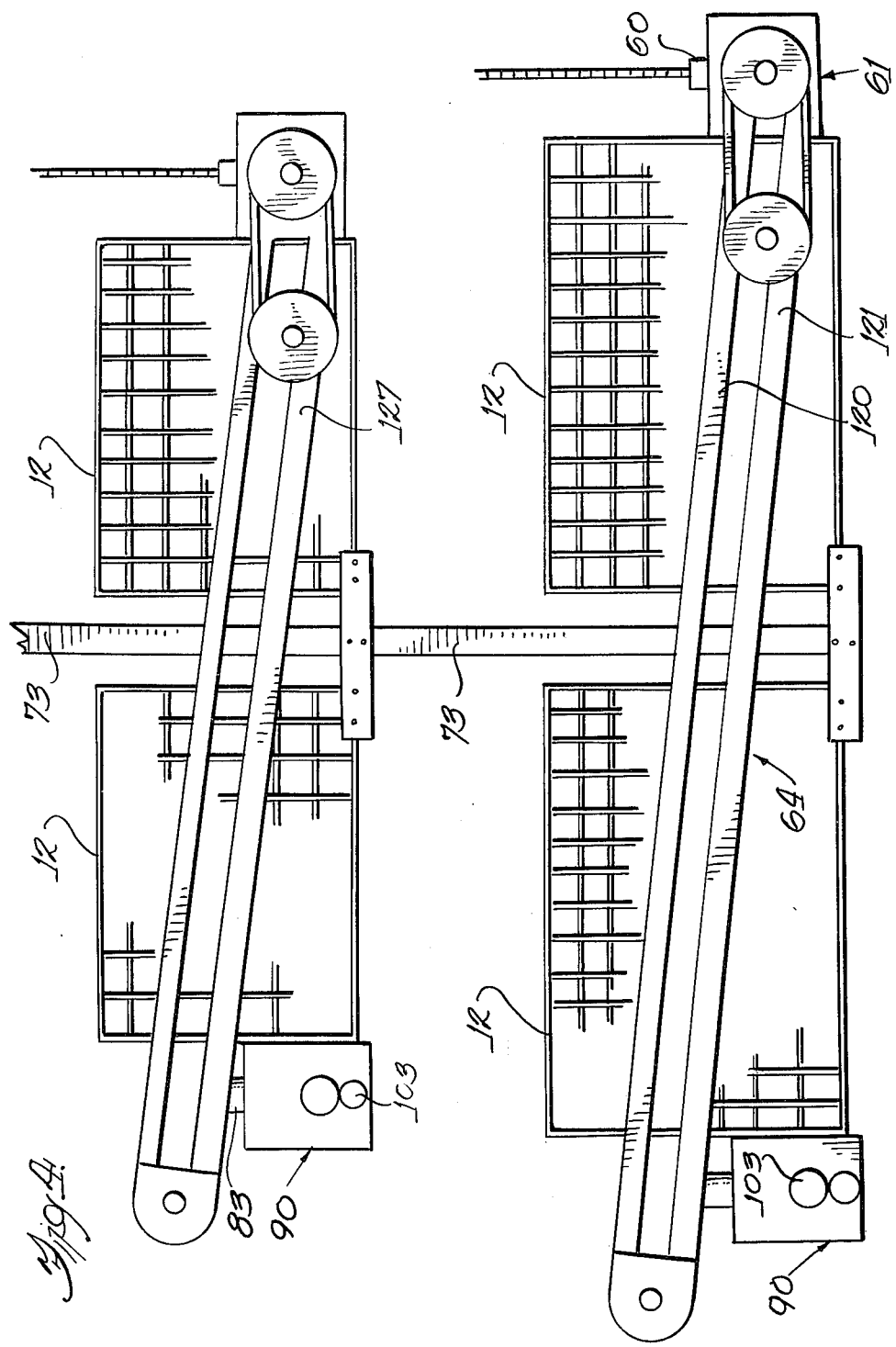

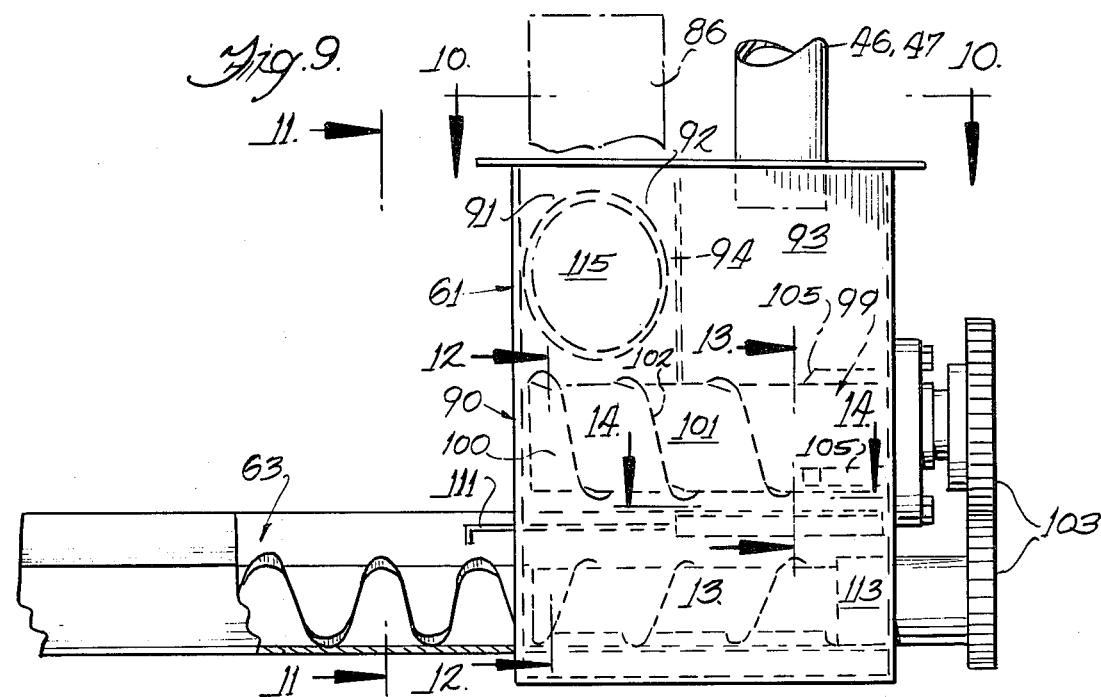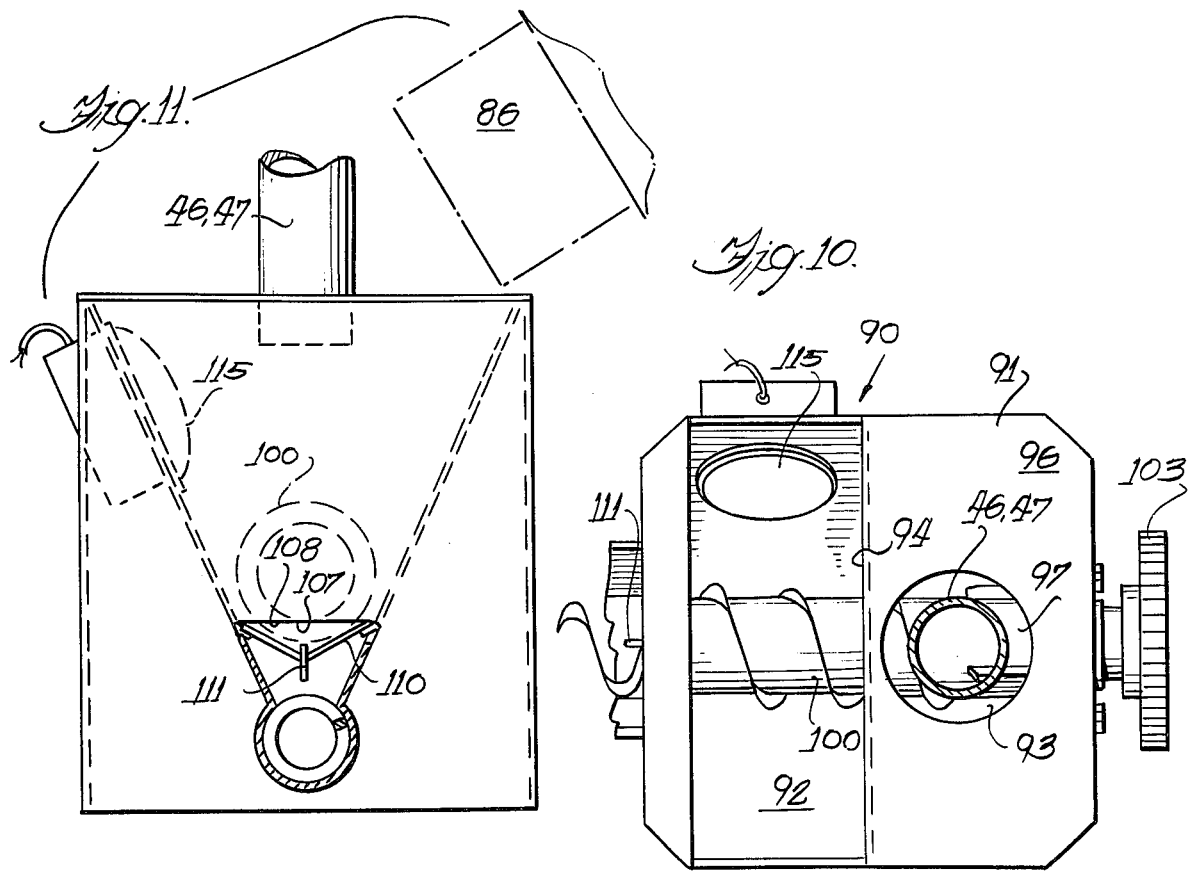

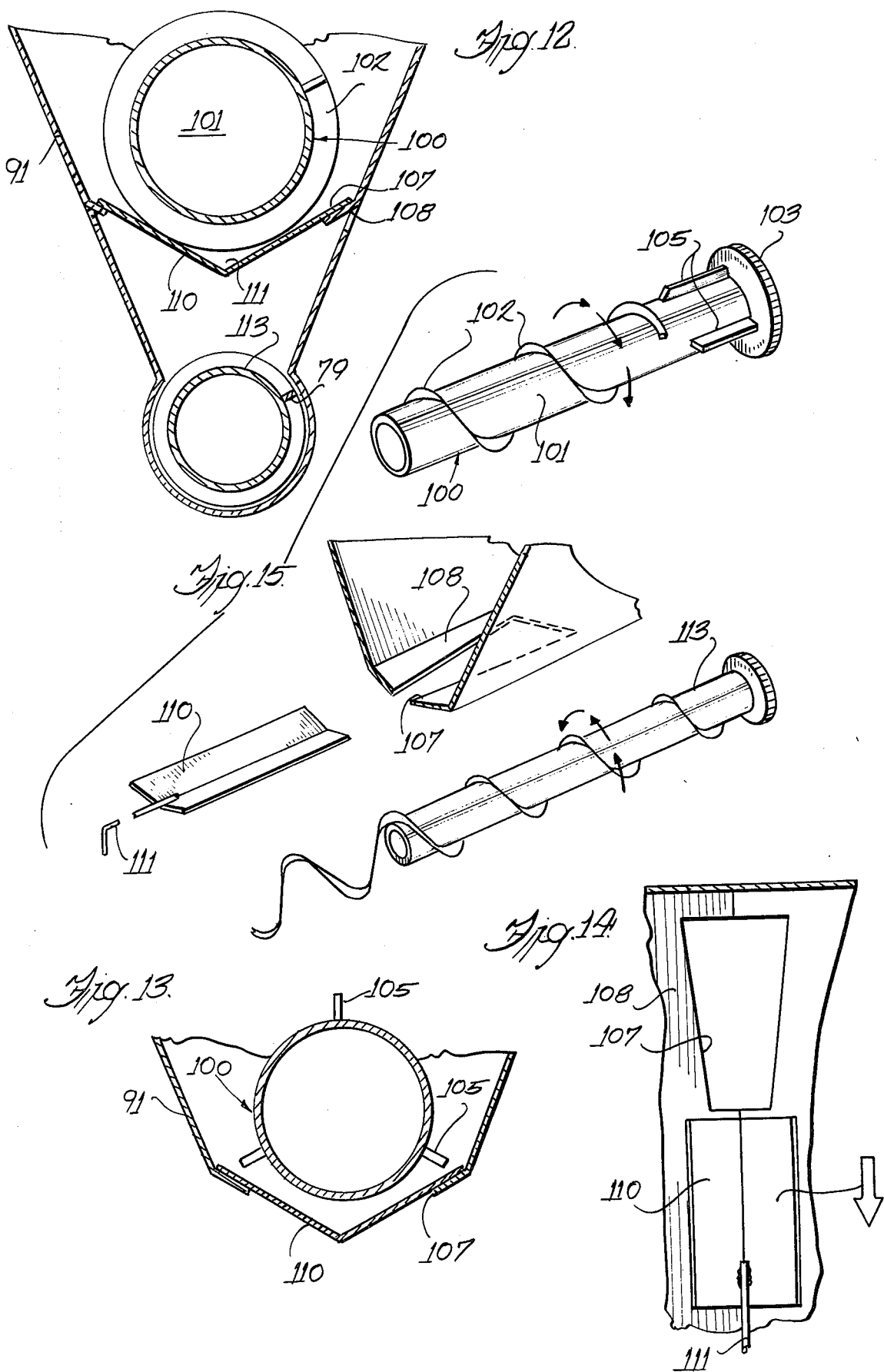

WEIGHT-CONTROLLED RECIRCULATING FEEDING APPARATUS AND METHOD

BACKGROUND OF THE INVENTION

This invention relates generally to feeding systems for poultry and the like, and more particularly concerns a feeding system wherein a pre-determined weight of feed is continuously circulated past poultry or like consuming animals located in relatively restricted areas such as small cages.

Modern poultry operations raise large flocks of breeding, laying, or broiling poultry to high levels of performance with relatively small amounts of hand labor. In the most advanced operations, closely controlled feeding programs are carried out by automated feeding equipment. One novel and successful system of this nature, which controls the weight of feed provided to a flock, is described in U.S. Pat. application Ser. No. 283,724, filed Aug. 25, 1972. This system is especially useful in feeding poultry flocks maintained in a relatively large poultry house, wherein the flock members are free to move about the house in more or less random fashion. The system provides a number of discrete feeder pans at spaced intervals, and the poultry quickly learn to approach the pans to obtain desired feed.

Other poultry house designs provide a relatively large number of relatively small cages, and each cage contains about four or five adult birds. Feeding caged fowl requires that feed be delivered to convenient access points adjacent each cage.

When the caged flock is properly fed and maintained, the laying hens convert maximum amounts of feed into end egg production, and relatively large numbers of full sized, commercially valuable eggs can be recovered from predesigned points within the poultry house. By carefully selecting the feed mix constituents and by carefully controlling the delivery of the feed mix to the poultry, considerable savings can be obtained. Further savings can be obtained by carefully decreasing the weight of feed delivered to the hens in proportion to their decreasing egg production as the hens become older.

In using many automated feeding systems, it can become important to avoid the collection of feed mix particles at any point within the system. Such collection may permit the feed mix components to separate, thereby delivering an unbalanced diet to the consuming poultry. Moreover, some collected feed particles may tend to putrefy and spoil adjacent feed. Elimination of collection points within the feeding system also encourages the complete intermingling of feed mix particles with particles of differing sizes, shapes, weights and consistencies. Delivery of a full proportion of the feed mix to all the feed dispensing locations is important if the receiving poultry are to consume a balanced diet of feed, as the system operator has intended.

It is therefore the general object of this invention to provide a feed system which delivers a preselected weight of feed to all the members of a poultry flock when that poultry flock is maintained in a series of cages or like restricted areas.

It is another object to provide a feed system which delivers a pre-designed feed mixture to a pre-designated point adjacent each cage in a cage-system poultry house.

It is yet another object of the invention to provide a feed system wherein weighed feed mix is presented on a substantially continual basis to caged birds. A related object is to provide a feed system wherein feed particles are repeatedly presented to poultry until they are consumed.

Still another object is to provide a feed system wherein the feed does not collect at any single point within the system.

A further object of the invention is to provide a feed system wherein feed mix component separation is inhibited. A related object is to provide a system wherein a mixer device positively encourages the intermingling of new and recirculated feed flow streams.

A still further object of the invention is to provide a feed system which encourages poultry to consume older feed particles with new feed particles.

Other objects and advantages of the invention will become apparent upon reading the following detailed description and upon reference to the drawings. Throughout the description like reference numerals refer to like parts.

BRIEF DESCRIPTION OF THE DRAWINGS

FIG. 1 is an overall perspective view of a typical cage-type poultry house and the novel feed system of the present invention, portions of the poultry house being eliminated to show the feeding system in further detail;

FIG. 2 is an elevational view of the poultry house interior showing further details of the novel feeding system in its general aspect;

FIG. 3 is an elevational view of the feeding and recirculating mechanism taken substantially in the plane of line 3—3 in FIG. 1, mid-portions of the elongated trough and cage arrays being deleted for purposes of clarity;

FIG. 4 is an end elevational view of the feeding and recirculating apparatus of the present invention taken substantially in the plane of line 4—4 in FIG. 1;

FIG. 5 is a perspective view showing, somewhat schematically, the arrangement of the feeding and recirculating components and their operation;

FIG. 6 is an elevational view showing a typical feed conveyor, a feed-consuming fowl, and an enclosing cage;

FIG. 7 is a fragmentary perspective view showing in further detail a feed trough and a feed-moving auger;

FIG. 8 is a plan view showing the mechanism by which a typical line conveyor and transfer conveyor are connected to a driving device such as an electric motor;

FIG. 9 is a fragmentary elevational view showing a feed receiver mechanism used in the system in its general aspect;

FIG. 10 is a plan view of the receiver taken substantially in the plane of line 10—10 in FIG. 9;

FIG. 11 is an end elevational view of the receiver taken in section substantially in the plane of line 11—11 in FIG. 9;

FIG. 12 is a fragmentary end view taken in section substantially in the plane of line 12—12 in FIG. 9;

FIG. 13 is a sectional view taken substantially in the plane of line 13—13 in FIG. 9;

FIG. 14 is a sectional view taken substantially in the plane of line 14—14 in FIG. 9; and FIG. 15 is an exploded view showing parts of the feed receiver mechanism.

DETAILED DESCRIPTION

While the invention will be described in connection with a preferred embodiment and procedure, it will be understood that it is not intended to limit the invention to that embodiment or procedure. On the contrary, it is intended to cover all alternatives, modifications and equivalents as may be included within the spirit and scope of the invention.

Turning first to FIGS. 1 and 2, there is shown the novel poultry feeding system 10 as it appears when installed within a typical poultry house 11 having an array of relatively small cages 12 designed to contain about four or five birds each. The superstructure of the poultry house 11 can include rafters or joists 13 from which portions of the feeding system 10 can be hung. Located outside the house or in another convenient location is a feed supply bin 15 of large capacity which can be supported by columns 16 on a foundation 17.

In accordance with the invention, a weighed amount of feed is first accumulated before delivery to the poultry. To this end, feed is directed from the remote supply bin 15 along a lead-in conveyor 20 and a header conveyor 21 to a feed weighing device 22. As generally described in U.S. Pat. No. 3,598,087 to Ramser, the lead-in conveyor 20 and the header conveyor 21 can each comprise a generally hollow tube and an internal auger which is rotated by a motor 23 or other driving device to urge the feed supply along the tube. When the incoming feed reaches a preliminary drop tube 25, part of the feed can be diverted to the first weighing device 22; remaining feed can be directed along one or more subsequent drop tubes 26 to subsequent weighing devices 28. As the header conveyor auger drive 23 operates, feed is continuously drawn from the remote supply bin 15, dropped through each of the drop tubes 25 and 26 and continuously accumulated in the weighing devices 22 and 28.

If desired, a time clock mechanism 29 can be used to actuate the conveyor drive 23 and start delivery of feed from the bulk feed storage tank 15 to the weighing devices 22 and 28. One such time clock has a 48-hour cycle to permit extended programming and feeding scheduling. This long term scheduling permits feed delivery on an every-other-day basis, thereby developing the fowls' feed consumption capacities. The contacts of the time clock switch may be of the two-position variety, allowing the time switch to be selectively programmed to alternatively emit, terminate, or otherwise alter a signal transmitted to associated motors and other equipment. A time clock switch of this type is commercially available from Tork Time Controls, Inc., 100 Grove Street, Mt. Vernon, New York, 10551.

As the feed flows down the drop tube 25 into the typical weighing device 22, an adjustable weight scale device 30 senses the weight of feed accumulating in a hopper 31, suspended from a balance beam 32. When a sufficient amount of feed has accumulated in the hopper 31, the balance beam 32 trips, and an electrical or other signal is transmitted from the weight scale device 30 to a drop tube shut-off valve 33 located atop the drop tube 25 at the junction of the drop tube 25 and header conveyor 21. The shut-off valve 33 then closes, terminating the flow of feed to the weighing means when a pre-determined weight of feed has accumulated in the weighing means. By appropriate adjustment of the calibrated indicator 34 located at the side of the weight scale 30, relatively greater or lesser amounts of feed can be accumulated in the hopper 31 at the discretion of the feed system operator. In the illustrated embodiment, the weight scale 30 is suspended from a convenient support 35 by cables 36, and the hopper 31 is suspended, in turn, from the balance beam 32 by other cables 37.

After the first hopper 31 has been isolated by the shut-off valve 33, feed moving along the header conveyor 21 is delivered to a downstream drop tube 26. When all the weighing devices 22 and 28 have been filled with a pre-selected weight of feed, operation of the header conveyor 21 is automatically halted by means of electric circuitry (not shown). The circuitry associated with the weight scale device at the extreme downstream end of the header conveyor 22 can be conveniently adapted to perform this task. Further operation of the header conveyor 21 can be blocked by a relay or switching mechanism in the time clock 29 until another hopper-filling cycle is required by the time switch device.

In accordance with another aspect of the invention, feed is delivered from the weighing hopper 31 to one or more feed recirculating and presenting devices. After the weighing devices 22 and 28 are filled, and the hopper-filling electric circuitry is de-energized, the time clock 29 energizes an appropriate motor 40 to operate a transfer conveyor 41 and transfer feed from the weighing hoppers 31 to the remaining portions of the feed system. In the illustrated embodiment, this transfer conveyor 41 takes the form of an auger conveyor or Archimedian Screw having an outer tube 43, within which an auger or screw member (not shown) is rotated by the motor 40. The motor 40 can be mounted underneath the associated hopper 31 or in some other convenient location where it will not interfere with the passage of personnel along the aisles between the cages and conveyors. Alternatively, the transfer conveyor 41 can comprise a hollow housing within which an endless flexible belt, such as a chain, is mounted for cyclic motion. A number of flights or scoops can be attached to the belt to scoop feed from the hopper bottom for transfer to the remaining portions of the feed system.

Feed is discharged from the conveyor 41 through any of a number of spouts or discharge tubes 46 or 47. If desired, shut-off valves (not shown) similar to the drop tube valves 33 can be interposed at the junctions of the conveyor 41 and the discharge tubes 46 and 47. These shut-off valves can be electrically or otherwise connected to feed level sensing switches located elsewhere in the feeding system to halt feed flow to the downstream system parts when the downstream parts have been filled to a pre-determined level. Alternatively, these discharge tube shut-off valves can be actuated by the timer switch 29, or by other means. When the discharge tubes 46 and 47 are completely filled, or when the discharge valve is closed, the transferring feed is simply carried farther along the transfer conveyor 40 for delivery to a subsequent discharge tube. Feed which is not discharged through any of the discharge tubes 46 and 47 is carried to an overflow tube 48, and is returned or redelivered to the hopper 31. Thus, no feed is allowed to build up or collect within the transfer conveyor 41, and no feed wastage is permitted.

In accordance with yet another aspect of the invention, the weighed amount of feed is continuously recirculated past the poultry for consumption. To accomplish this, feed from the transfer conveyor 41 is received at an upstream receiving point 60 into a recirculating feeder 61. Operation of the feeding system at the receiving point 60 is described below. As illustrated in FIGS. 3–6, this recirculating feeder 61 includes a first feed line conveyor 63, a first cross conveyor 64, a second or return feed conveyor 65, and a second cross conveyor 66 which returns unconsumed feed to the originating upstream receiving point 60.

Fowls 70 constituting the flock are maintained in small cages 12 which can be mounted in linear array upon supports 73, as shown particularly in FIG. 4. Since each fowl 70 is capable of only limited movement, the necessary feed must be transported to each cage 12. As illustrated in FIG. 6 and elsewhere, the first feed line 63 therefore includes a continuous trough 74 having a feed-supporting bottom 75 and a top 76 open along its length and adapted to provide access to contained feed 77 by the consuming poultry 70. The feed 77 is pulled from the upstream receiving point 60 to a downstream transfer point 78 by a helical centerless auger member 79 which is rotated by a motor 80 or by another convenient power mechanism. This motor can be initially energized in response to the sensed presence or accumulation of feed in the conveyor trough 74 by a sensing switch (not shown), or in response to a signal from the time clock 29, or by other means.

As shown in FIG. 8, a typical feed line conveyor 63 and the associated transfer conveyor 64 are each connected to the drive motor 80 by a belt drive 81 and geared interconnector 82. These interconnection mechanisms 81 and 82 permit the auger member 79 to be manually rotated within the trough 74 for checking auger motion during initial system set-up or repair. Further, during starting and operation of the line conveyor 63, "wrapping" occurs: the auger member 79 is slightly and resiliently torsionally strained throughout its length so that the portion of the auger member 79 near the conveyor drives 80–82 may complete several revolutions of motion before the portion of the auger member at the opposite end is set in motion. In this respect, the auger member 79 acts as a coil spring wherein potential energy is stored. Now, when delivery of motive power to the auger 79 is halted, the wrapped auger 79 tends to "unwrap" and drive the connected motor 80 in a reverse direction. This reverse motion can damage a split-phase wired motor 80 or cause other undesired effects in the system. Use of the interconnecting V-belt drive 81 inhibits such motor reverse motion. The stored energy is expended in unwrapping motion at the end of the auger 79 which is not connected to the motor 80. Moreover, the V-belt drive 81 permits the motor 80 to be mounted in a location which is out of the service aisle, yet which is convenient for servicing. Appropriate gears within the gearbox 82 permit the auger 79 to be driven at a pre-determined speed whether the motor 80 is to be operated from 60 cycle alternating current, 50 cycle current, or some other electrical energy input format.

The conveyor 63 has an open top which permits each of the consuming poultry 70 located in each cage 12 to reach the feed passing by the cage 12 and to consume as much as desired. Thus, during operation of the recirculating device 61 and the conveyor 63, fresh feed is continuously brought before the fowl 70, thereby inhibiting the accumulation of feed at any one point within the circulating device 61. It is also to be noted that the centerless auger member 79 stirs the feed 77 as it is transported along the conveyor 63, thereby encouraging a fully intermingled feed mix to be presented to each of the consuming fowl 70.

Feed which has not been consumed upon reaching the downstream point 78 is moved to the return feed line 65, by the first cross conveyor 64, and is discharged through an appropriate spout 83. If desired, a surge bin and appropriate feed load sensors (not shown) can be included at this point. The sensors can be connected to the relatively downstream drive motor 80 or other system drives to halt feed flow into the surge bin if an excessively high level of feed is sensed.

The return conveyor 65 is constructed in a manner identical with the first feed line conveyor 63. Feed entering the return conveyor 65 is moved sequentially past each of the adjacent poultry-housing cages 12. Upon arrival at a head end 84 of the return conveyor 65 adjacent a second motor 85, unconsumed feed is discharged into the second cross conveyor 66. This second cross conveyor 66 returns the unconsumed feed to the upstream receiving point 60 of the first feed line conveyor 63 through a second spout 86. Thus, feed is continuously recirculated about a closed-circuit path, as may be envisioned by reference to the arrows 87 shown in FIG. 5. Additional fresh feed is added to the recirculating device 61 through the transfer conveyor drop tube 46 at the receiving point 60.

From the foregoing description it will be understood that two streams of feed are simultaneously directed to the receiving point 60, while feed is being carried away by the associated first feed line conveyor 63. A first stream of new feed is directed to the receiving point 60 by the transfer conveyor 41 the associated discharge tube 46 or 47. A second stream of recirculating feed is directed to the receiving point 60 by the second cross conveyor 66 and associated spout 86.

It is a feature of the invention that a smooth intermixing of these two feed inflows and a measured, even discharge of feed to the conveyor is achieved. To accomplish this, the feed receiver 90 shown in FIGS. 9–14 and elsewhere is provided. In the illustrated embodiment, this receiver 90 include a slope-sided bin 91 divided into two receiving chambers 92 and 93 by a plate 94. Since new feed arrives at the receiver 90 from a relatively great height along the discharge tubes 46 and 47, a cover plate 96 incapsulates the associated chamber 93 to permit the feed to be held within the chamber 93, and to back up in a statically stored condition if necessary in the discharge tubes 46 and 47 without spillage. A hole 97 is provided in the plate 96 to permit the discharge tube 46 or 47 to be functionally coupled to the receiver 90 without difficulty. The remaining receiver chamber 92 is adapted to receive and store all the feed delivered by the spout 86; no plate covers this chamber in the illustrated embodiment.

The receiver 90 includes a powered mixer 99 to positively move feed from the chambers 92 and 93 and deliver it to the associated conveyor 63. An auger member 100, here including a shaft 101 and a relatively small or thin flight 102 extends through the plate 94, and is driven by gearing 103 from the conveyor auger 79 located below it. This movement of feed from the two chambers by the shafted auger mixer 99 encourages intermingling of the new feed from the chamber 93 and the recirculated feed from the chamber 91. Flights 105 extending axially of the shaft 101 agitate the feed and if necessary force it through a generally trapezoidal hole 107 in the floor 108 of the chamber 93 (FIG. 14). A sliding gate 110 can be mutually adjusted by a handle 111 or other means to control the effective size of the hole 107 and the amount of intermixed new and recirculating feed being delivered to the conveyor 63. Thus, old feed does not stagnate in the system, but is continuously intermixed with new feed and is recurrently presented to the fowl for consumption.

The intermixed feed, after falling through the hole 107, is engaged by the flights of the conveyor auger member 79, and is withdrawn from the receiver 90 into the line conveyor 63. In the illustrated embodiment the auger conveyor 79 drives the gearing 103 by an interconnecting shaft 113. A sensor 115 is connected to a switch 116 to halt the relatively downstream cross conveyor 66 and its drive motor 85 if an excess of feed is received in the receiving compartment 92.

Each of the cross conveyors 64 and 66 illustrated here are constructed to include two hollow tubular members 120 and 121 through which an endless flexible belt such as a chain (not shown) cycles. The belt is provided with scoops or flights which transport the feed from the pickup point adjacent each line conveyor 61 and 65, and transfer the feed across the lines of cages 12 to the opposite line conveyor 65 and 61. Thus, feed flows from the downstream point 78 back to the upstream receiving point 60 for recirculation to the consuming poultry, and is continuously recirculated past the poultry until it is ultimately devoured. None of the feed presented to the poultry is wasted by discharge from the system or collection at inactive points within the system.

In carrying out the invention, it will be noted that several sets of cages 12 and recirculating feeder devices can be stacked vertically atop one another to accommodate more fowl in a given poultry house. In this arrangement, the cage sets and a number of recirculating feeder devices can be located to receive feed from a common weighing device 30 and/or transfer conveyor 41. In the illustrated embodiment of the invention, a second recirculating feeder device 125 is mounted above the first recirculating feeder 61. This second recirculating feeder 125 includes a combination of a first feeder 126 and a first cross conveyor 127, both driven by a common first motor 128, similar to that described above. A return feed line feed conveyor 129 and a second cross conveyor 130 are each driven by a second motor 131. Feed is initially delivered to this second recirculating device through the upper drop tube 47 connected to the transfer conveyor 41 and a receiver 132. Feed is continuously urged about the recirculating conveyor 126 in the direction indicated by the arrows 133 in FIG. 5 until it is ultimately consumed by the poultry.

The invention is claimed as follows:

1. A feeding system for poultry and the like, comprising feed weighing means for receiving and weighing a measure of feed from a remote supply, and feed recirculating means operatively connected to the feed weighing means and having an upstream receiving point for receiving feed from the weighing means at said point, the recirculating means including a first feed line for presenting feed to poultry in a manner permitting consumption of the feed by the poultry, means for urging the feed from the upstream receiving point to a downstream point and feed return means interconnected between the downstream point and the recirculating means upstream receiving point for returning unconsumed feed from the downstream point to the upstream receiving point.

2. A feeding system according to claim 1 including a plurality of feed recirculating means operatively connected to a common feed weighing means to receive feed therefrom, each recirculating means being adapted to endlessly recirculate the receiving feed without returning said feed to the weighing means.

3. A feeding system according to claim 1 including feed transfer means for drawing feed from the feed weighing means and delivering at least a portion of the drawn feed to the feed recirculating means.

4. A feeding system according to claim 3 including feed return means for returning any undelivered feed from the transfer means to the weighing means.

5. A feeding system according to claim 1 including receiver means having means for receiving unconsumed feed at the upstream receiving point and having other means for receiving feed from the weighing means, the receiver means being adapted to discharge the received feed to the recirculating means.

6. A feeding system according to claim 1 wherein said feed weighing means includes means for receiving a flow of feed from a remote supply, signal means actuatable by a pre-determined weight of received feed, and shut-off means responsive to the signal means for terminating the flow of feed to the weighing means when a pre-determined weight of feed has been received therein.

7. A feeding system for poultry and the like, comprising feed weighing means for receiving a weighed measure of feed from a remote supply, feed transfer means for receiving feed from the weighing means, feed recirculating means having an upstream receiving point adapted to receive feed from the transfer means and a downstream point, the recirculating means including a first feed line means operatively connected to the upstream receiving point for presenting the received feed to the poultry in a manner permitting consumption of the feed by the poultry and means for urging the feed from the upstream receiving point to the downstream point, the recirculating means further including means for moving unconsumed feed from the downstream back to the upstream receiving point for recirculation to the consuming poultry.

8. A feeding system according to claim 7 including a plurality of recirculating means operatively connected to a common feed transfer means to receive feed therefrom.

9. A feeding system according to claim 7 wherein said first feed line comprises a trough having a feed-supporting bottom and a top open along its length and adapted to provide access to contained feed by consuming poultry.

10. A feeding system according to claim 7 wherein said feed recirculating means comprises first cross feed movement means operatively connected to said downstream point, feed return line means for receiving feed from the first cross feed movement means, and second cross feed movement means operatively connected to the feed return line for transferring unconsumed feed to the upstream receiving point.

11. A feeding system according to claim 7 including receiver means for receiving a first stream of new feed from said feed transfer means and a second stream of feed from said recirculating means downstream point, said receiver means being adapted to intermingle said first and second stream of feed and to discharge said intermingled feed in said recirculating means at said upstream receiving point.

12. A feeding system according to claim 11 wherein said receiver means includes a first and a second chamber for receiving said streams of feed, said second chamber being adapted to hold feed in a statically stored condition within said transfer means.

13. A feeding system according to claim 11 including powered mixer means to positively intermingle said streams of feed and to deliver said feed to said first feed line means.

14. A feeding system according to claim 11 including means for adjusting the amount of intermixed new and recirculated feed delivered to said first feed line means.

15. A feeding system according to claim 10 wherein said first feed line means and said feed return line means each includes a trough having a feed supporting bottom and a top open along its length and adapted to provide access to contained feed by consuming poultry, and auger means for moving the feed along the trough to a cross feed movement means.

16. A feeding system according to claim 15 wherein said auger means tend to assume a wrapped condition during operation, and including means for preventing said wrapped augers from driving any drive means connected thereto in a reverse direction when said auger means are not powered.

17. A feed system according to claim 7 wherein said feed transfer means includes feed delivery means for delivering feed from the feed weighing means to the feed recirculating means upstream receiving point, and overflow means for returning feed not delivered to the receiving point to the feed weighing means.

18. A method of feeding poultry and the like, comprising the steps of directing a flow of feed from a remote supply to a weighing means, temporarily accumulating the inflowing feed in the weighing means, terminating the flow of feed to the weighing means when a pre-determined weight of feed has accumulated in the weighing means, transferring feed from the weighing means to an upstream receiving point in a feed recirculating means, urging the feed through the recirculating means, presenting the feed in the recirculating means to poultry for consumption, and returning unconsumed feed to the recirculating means upstream, receiving point for endless recirculation to the poultry.

19. A method according to claim 18 including the steps of receiving at least a portion of the transferring feed at the recirculating means upstream receiving point, and redelivering any feed unreceived by the recirculating means to the weighing means.

20. A method according to claim 18 including the steps of urging the feed in the recirculating means along a first feed line, urging the feed along a first cross feed means, urging the feed along a feed return line, and urging the feed along a second cross feed means for return to the upstream feed receiving point without returning feed in the recirculating means to said weighing means.

21. A method according to claim 20 including the steps of presenting the feed in the feed return line to poultry for consumption, and delivering unconsumed feed from the feed return line to the second transfer means.

22. A method according to claim 20 including the step of intermixing feed from the second cross feed means with feed from the transfer means.

23. A method according to claim 18 including the steps of depositing feed from the first cross feed means atop any feed already contained in the return line.

* * * * *